United States Patent
Meijer et al.

(10) Patent No.: US 8,806,468 B2
(45) Date of Patent: *Aug. 12, 2014

(54) ON-DEMAND LOADING OF TYPES OF SOFTWARE CODE OF A PROGRAM EXECUTING ON A COMPUTING DEVICE

(75) Inventors: Henricus Johannes Maria Meijer, Mercer Island, WA (US); Jeffrey Van Gogh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 237 days.

This patent is subject to a terminal disclaimer.

(21) Appl. No.: 13/350,774

(22) Filed: Jan. 14, 2012

(65) Prior Publication Data

US 2012/0117554 A1    May 10, 2012

Related U.S. Application Data

(63) Continuation of application No. 11/974,816, filed on Oct. 16, 2007, now Pat. No. 8,127,284.

(51) Int. Cl.
*G06F 9/44* (2006.01)
*G06F 9/445* (2006.01)

(52) U.S. Cl.
CPC ................... *G06F 9/44521* (2013.01)
USPC .......................................... 717/166; 717/172

(58) Field of Classification Search
CPC ...................................................... G06F 9/445
USPC .................. 717/162–167, 171–173, 176–178
See application file for complete search history.

(56) References Cited

U.S. PATENT DOCUMENTS

| | | | |
|---|---|---|---|
| 5,966,702 A | 10/1999 | Fresko et al. | |
| 6,339,841 B1 | 1/2002 | Merrick et al. | |
| 6,571,388 B1 | 5/2003 | Venkatraman et al. | |
| 6,584,612 B1 | 6/2003 | Mueller et al. | |
| 6,643,711 B2 | 11/2003 | Bracha et al. | |
| 7,020,874 B2 | 3/2006 | Sokolov et al. | |
| 7,257,625 B2 | 8/2007 | Wu et al. | |
| 7,752,258 B2 | 7/2010 | Lewin et al. | |
| 8,127,284 B2 * | 2/2012 | Meijer et al. .................. | 717/166 |
| 2004/0168163 A1 | 8/2004 | Choi et al. | |
| 2007/0169069 A1 | 7/2007 | Burka et al. | |

OTHER PUBLICATIONS

Krintz, et al., "Reducing Transfer Delay Using Java Class File Splitting and Prefetching", In proceedings of 14th Annual ACM SIGPLAN Conference on Object-Oriented Programming Systems, Languages, and Applications (OOPSLA), Date: Nov., 1999, pp. 1-16.
Kokku et al., "NPS: A Non-interfering Deployable Web Prefetching System", 2003, CiteSeerX, 14 pages.

(Continued)

*Primary Examiner* — Ted T Vo
(74) *Attorney, Agent, or Firm* — Kate Drakos; Micky Minhas; Zete Law, P.L.L.C.

(57) ABSTRACT

A first computing device receives (over a network) from at least a second computing device a container that includes information relating to types of software code that are potentially invoked by a program executing on the first computing device. A determination is made according to an on-demand basis, during execution of the program, whether a particular type of software code is to be loaded from the at least second computing device to the first computing device.

20 Claims, 3 Drawing Sheets

(56) References Cited

OTHER PUBLICATIONS

BetterExplained.com, "Speed Up Your Javascript Load Time", Feb. 2007, http://replay.web.archive.org/20070224105350/, 7 pages.

BetterExplained.com, "Speed Up Your Javascript, Part 2: Downloadable Examples!", Feb. 2007, http://replay.web.archive.org/20070228094934/, 6 pages.

* cited by examiner

ON-DEMAND LOADING OF TYPES OF SOFTWARE CODE OF A PROGRAM EXECUTING ON A COMPUTING DEVICE

RELATED APPLICATIONS

This application is a continuation of, and claims priority to, U.S. patent application Ser. No. 11/974,816, filed Oct. 16, 2007, and entitled "ON DEMAND LOADING OF TYPES OF SOFTWARE CODE OF A PROGRAM EXECUTING ON A COMPUTING DEVICE", issued as U.S. Pat. No. 8,127,284 on Feb. 28, 2012. The disclosure of the above-identified application is hereby incorporated by reference in its entirety as if set forth herein in full.

BACKGROUND

In a distributed computing environment, software on a first computing device is often loaded onto a second computing device for execution on the second computing device. A typical scenario is when a client computer downloads software from a server computer over a network for execution on the client computer. This can often come up in the context of a web-based environment, in which a user at the client computer accesses a web page on the server computer, and interaction between the client computer and the server computer causes execution of software programs on the client computer.

A client computer can have a relatively limited amount of resources (e.g., storage resources and/or processing resources). For example, the client computer can be a mobile device such as a personal digital assistant, a mobile telephone, and the like. Alternatively, the network between the client computer and the server computer may be a relatively low bandwidth network. In the above scenarios, downloading relatively large amounts of software code (some of which may not be needed) onto the client computer may be inefficient, since overloading of the client computer may occur, or network bandwidth may be unnecessarily consumed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, according to some embodiments, software code of a program executing on a first computing device is loaded from a second computing device according to an on-demand basis. A container that includes information relating to types of software code is provided to the first computing device to enable the on-demand loading of types of software code to the first computing device.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

Overall Architecture

Figure 1:
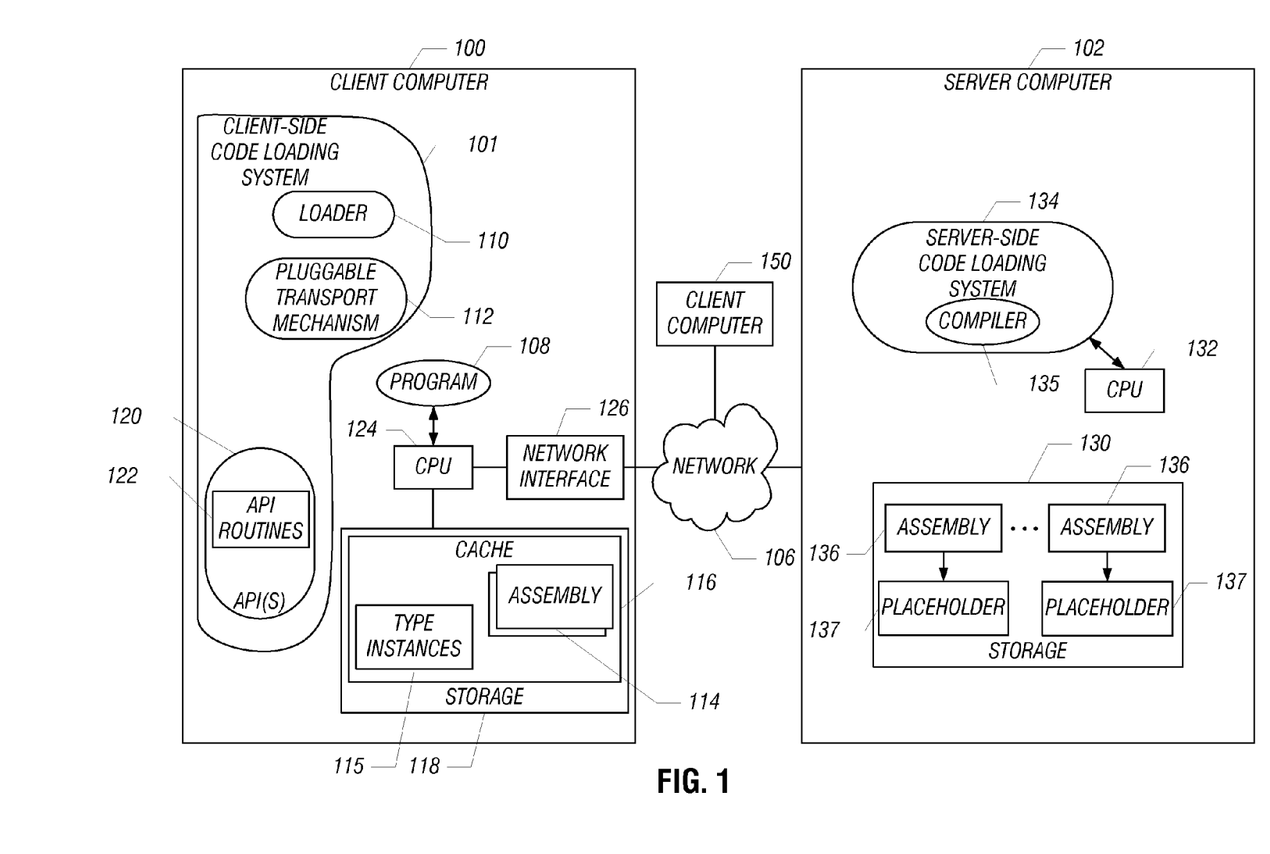
FIG. 1 illustrates an example arrangement including computing devices coupled over a network, in which an embodiment of on-demand loading of software code is provided.

FIG. 1 depicts an example arrangement that includes client computers 100, 150 and a server computer 102 interconnected by a wired and/or wireless network 106 (e.g., local area network, wide area network, Internet, etc.). Although just two client computers 100, 150 and one server computer 102 are depicted in FIG. 1, it is noted that there can be additional client computers and/or multiple server computers interconnected by the network 106. Also, although reference is made to a "client" computer and "server" computer, it is noted that some embodiments are applicable to other types of computing devices. More generally, a "computing device" refers to any device capable of performing computing tasks, such as portable computers, desktop computers, personal digital assistants, mobile telephones, gaming consoles, and so forth.

In the ensuing discussion, reference is made to the client computers 100, 150 and server computer 102; however, it is contemplated that the described techniques are applicable to other types of computing devices.

As depicted in the example of FIG. 1, a program 108 is executable in the client computer 100. The program 108 may be a program that is invoked from another program in the client computer, such as a web browser (not shown). In one specific example, the server computer 102 may provide a website that a user at the client computer 100 can visit. A web page can be downloaded from the server computer 102 to the client computer 100. The web page can provide interactive features through which one or more programs can be invoked. Examples of such programs include JavaScript programs, Rich client programs, and so forth.

During execution of the program 108 in the client computer 100, various pieces of code are loaded. For example, such pieces of a code can be software methods (or more simply, "methods") that are loaded to perform predefined tasks. A "method" refers to any software routine or sequence of code to perform some action(s). If the client computer 100 has limited resources (e.g., limited storage and/or processing resources) or if it is desirable to reduce bandwidth consumption of the network 106, then improved efficiency can be achieved by preventing the loading of pieces of code that the program 108 does not need.

In accordance with some embodiments, the loading of pieces of software code into the client computer 100 from the server computer 102 can be performed on a type-by-type basis. As used herein, a type is a set of software routines (e.g., software methods and their encapsulated states). In some implementations, the set of methods of a particular type are relatively highly dependent on each other; as a result, it makes sense to load the methods of a set together into the client computer 100.

Types are loaded into the client computer 100 according to an on-demand basis during execution of the program 108. Loading of a type of software code according to an "on-demand" basis refers to loading the type when an executing program invokes (or is about to invoke) one or more methods in the type. As a particular type is needed by the program 108 during execution in the client computer 100, the particular type is loaded from the server computer 102 to the client computer 100.

The loading of the various types of methods according to the on-demand basis is transparent to the program 108. In other words, the program 108 asks for a particular type regardless of whether the type is already loaded in the client computer 100; for example, the program 108 would not need to first determine whether the type is already loaded in the client computer 100 before requesting that the type be loaded.

To enable the on-demand loading of types of software code according to some embodiments, a client-side code loading system 101 and server-side code loading system 103 are provided in the client computer 100 and server computer 102, respectively. The client-side code loading system 101 includes a loader 110 to perform loading of software code. In response to a request for a particular type of software code from the program 108, the loader 110 will determine if an instance of the particular type was previously loaded. If so, that instance is returned. However, if the particular type was not previously loaded, then the type will be loaded from the server computer 102 (as described further below).

Although reference is made to loading software code from the server computer 102 to the client computer 100, it is noted that certain pieces of software code may in fact be loaded from a different computer, such as the client computer 150. Obtaining software code from another client computer provides a peer-to-peer software loading feature in which a client computer can load pieces of software code from another client computer, rather than from a server computer. This may alleviate bottleneck issues if there are multiple client computers all trying to download code from one (or a small number of) server computer(s). In fact, different types of software code can be loaded from different computers, which can improve throughput.

Another feature of transporting types of code from the server computer 102 to the client computer 100 is that a superset of types can be returned in response to a request for a particular type, where the superset of types includes more types than the requested type. To enable this, a process in the client computer 100 does not have to wait for a return value in response to a request for a type. As a result, multiple types can be transported together. For example, in response to a request for type X from client computer 100, the server computer 102 can return type X along with other types (e.g., types Y and Z) in a superset of X, Y, and Z. Thus, generally, in response to a request for a particular type, the server computer 102 can deliver the requested type, as well as one or more other types, if desired.

In accordance with some embodiments, the loader 110 is not bound to any specific transport mechanism for loading types of code from the server computer 102 to the client computer 100. A pluggable loading transport mechanism 112 can be plugged into the client-side code loading system 101, where the transport mechanism 112 can be any native transport mechanism associated with a particular environment. By being able to work with a pluggable transport mechanism 112, the client-side code loading system 101 can be used with any type of platform, even on proprietary platforms. Examples of transport mechanisms include the following: (1) XMLHTTPREQUEST, which is an API (application programming interface) that can be used by Javascript or other scripting languages to transfer XML and other text data to and from a server using a Hypertext Transfer Protocol (HTTP) mechanism; (2) a transport mechanism based on script blocks; (3) a transport mechanism that is based on reading a file from a file system; and so forth.

In accordance with some embodiments, to enable the on-demand code loading system 101 in the client computer 100 to perform on-demand transport of types of code from the server computer 102 to the client computer 100, containers 114 are provided from the server computer 102 to the client computer 100. The containers 114 hold information to enable the client-side code loading system 101 to deduce types of code that may be needed by the program 108. The containers 114 can refer to each other.

Each container 114 includes information relating to types of software code that may potentially be invoked by the program 108 and thus may have to be transported to the client computer 100. A specific example of a container is an assembly, where an assembly is a partially compiled code library. Specifically, an assembly can be a .NET assembly, which is according to Microsoft's .NET framework that provides pre-coded solutions to various program features, such as user interface, data access, database connectivity, web application development, network communications, and so forth. .NET assemblies written for the .NET framework can be executed in various runtime environments.

Although the ensuing discussion refers to assemblies 114, it is noted that in different implementations, other types of containers can be employed.

Initially, the assemblies 114 loaded into the client computer 100 include empty data structures that are to be filled lazily with information relating to types of software code according to an on-demand basis. An assembly that has empty data structures is also referred to as an "assembly placeholder." Note that reference to an "assembly" in the ensuing discussion can refer to either a fully loaded assembly or an assembly placeholder. The assemblies 114 can be loaded in a local memory of the client computer 102, such as a local cache 116 that is implemented as part of the storage 118 of the client computer 100, where the storage 118 can be implemented with storage devices such as semiconductor storage devices, magnetic disk or optical disk storage devices, and so forth.

The client-side code loading system 101 also provides one or more application programming interfaces (APIs) 120 containing various API routines 122 that can be invoked to perform tasks associated with the client-side code loading system 101. Examples of various API routines 122 are discussed throughout this description.

The client-side code loading system 101 and program 108 are executable on one or more central processing units (CPUs) 124 in the client computer 100. The one or more CPUs 124 are connected to the cache 116, as well as to a network interface 126 to enable the client computer 100 to communicate over the network 106, such as with the server computer 102.

The server computer 102 includes a storage 130 that is connected to one or more CPUs 132. The server computer 102 includes a server-side code loading system 134 that is executable on the one or more CPUs 132. The server-side code loading system 134 is able to process requests from the client-side code loading system 101, and to provide appropriate responses to such requests. Also, in one embodiment, the server-side code loading system 134 is able to determine what other types, if any, are to be transported to the client computer 100 in response to a request for a particular type.

As depicted in FIG. 1, the storage 130 of the server computer 102 includes various assemblies 136 that contain code that may be invoked by the program 108 during execution of the program 108 at the client computer 100.

The server-side code loading system 134 includes a compiler 135 that is able to compile each of the assemblies 136 depicted in the storage 130 into a corresponding assembly placeholder 137 (which can be in the form of a JavaScript file, for example). Compiling the assemblies 136 into assembly placeholders 137 allows for the assembly placeholders 137 to be initially transported to the client computer 100 without having to transport the entire assemblies 136 (which would involve having to transport all code associated with the assemblies 136 initially). Instead, according to some embodiments, after initial loading of the assembly placeholders to the client computer 100, types of software code can be loaded according to an on-demand basis.

Figure 2:
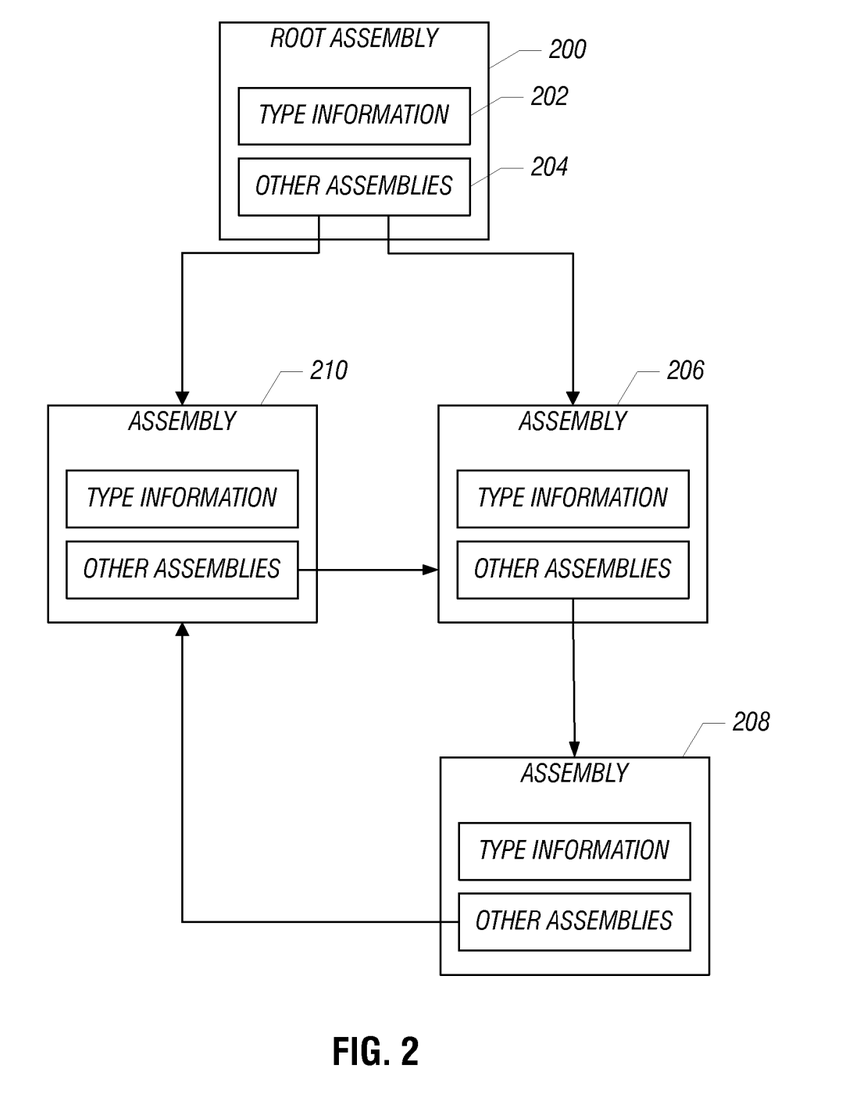
FIG. 2 illustrates an example arrangement of assemblies to enable the on-demand loading of software code according to an embodiment.

An example arrangement of assemblies is depicted in FIG. 2. The arrangement includes a root assembly 200 which includes first information 202 that refers to types of code, and second information 204 that refers to other assemblies 206, 210. The assembly 206 can in turn refer to another assembly 208, and the assembly 210 can refer to the assembly 206.

The first information 202 can be in the form of one or more data structures (e.g., a form of containers) that are initially empty. The initially empty data structures can be filled with information later on as types are loaded into the client computer 100. The second information 204 contains references to other assemblies. As the program 108 is executed, the program 108 can invoke various methods including methods of a type of software code that has not been loaded on the client computer. Such invocation of the methods can, in turn, trigger the loading of types to the client computer 100. As a result, the initially empty data structures that can contain type information in the various assemblies are filled with information regarding types that have been loaded.

General Flow

Figures 3, 4:
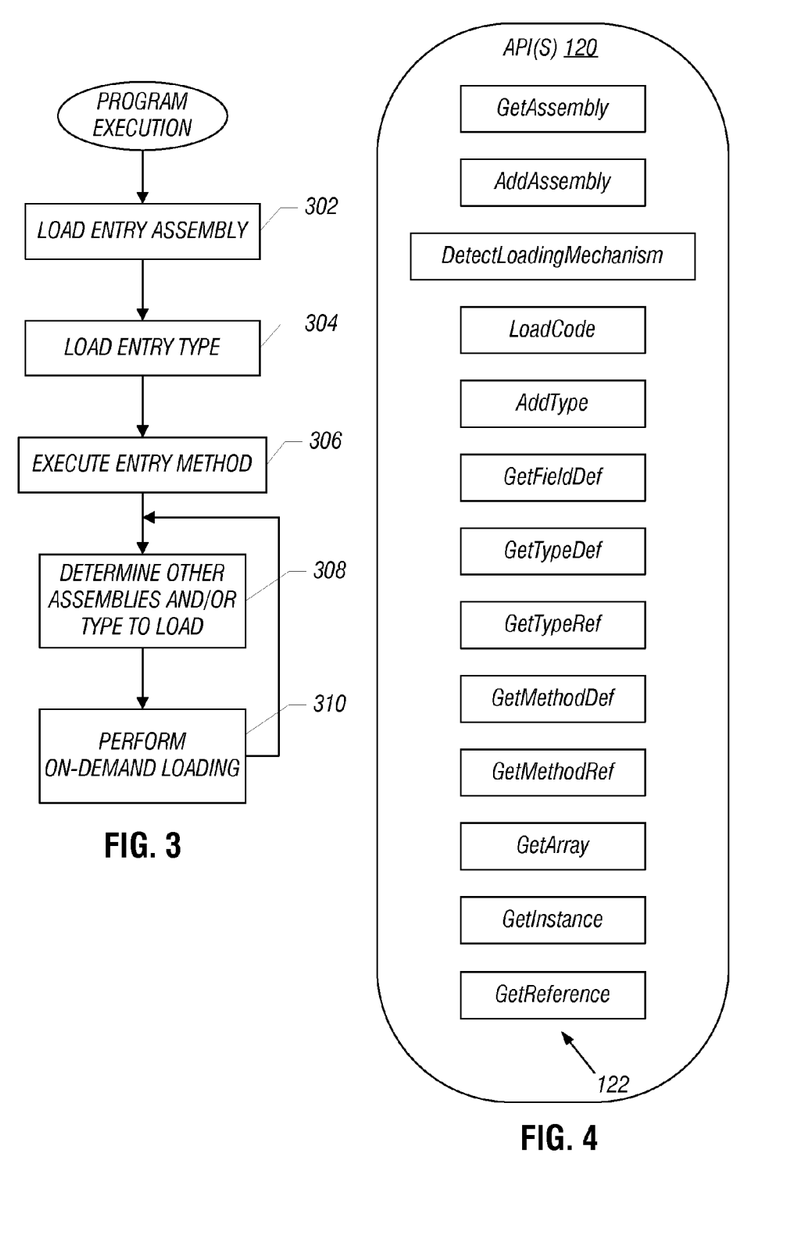
FIG. 3 is a flow diagram of a process of performing on-demand loading of software code, according to an embodiment.
FIG. 4 illustrates an example application programming interface (API) according to an embodiment.

A general flow for program execution in the client computer 100 is depicted in FIG. 3. Initially, an entry assembly (which is the assembly that provides the entry into the program 108) is loaded (at 302) from the server computer 102 to the client computer 100, where loading of the entry assembly refers to initially loading the assembly placeholder of the entry assembly into the client computer 100. Loading is accomplished by the program 108 invoking the loader 110 (FIG. 1), which in turn invokes the pluggable transport mechanism 112 to load the requested code. In one implementation, the entry assembly, which can be .NET code in one example, is compiled at the server computer 102 into the assembly placeholder 137.

The assembly placeholder for the entry assembly initially contains empty data structures to store one or more types associated with the entry assembly. In one example, it is assumed that the entry assembly is associated with an entry type of code associated with entry methods. To continue execution of the program 108, the client-side code loading system 101 loads (at 304) the entry type along with associated entry methods. An entry method is then executed (at 306).

Note that the entry assembly can also refer to other assemblies (such as according to the arrangement of FIG. 2) that are to be invoked as the program 108 continues execution. Thus, as the program 108 continues to run, the program determines (at 308), based on the assemblies loaded so far in the client computer 100, other assemblies and/or types that are to be loaded to continue execution of the program 108. In this manner, on-demand loading of the assemblies and/or types into the client computer 100 is performed (at 310). The tasks 308 and 310 are repeated as the program 108 continues to run to enable continued on-demand loading of types of code that are to be invoked during execution of the program.

Assembly Loading

An example assembly (in the form of a Javascript file) is depicted below.

```
var Assembly =
{
    Name: "VoltaPrelude, Version=1.0.0.0, Culture-neutral,
PublicKeyToken=22649bc1055d4374",
    TypeDefs: { },
    TypeRefs: { },
    Instances: { },
    References:
    {
        ref0: (function( )
        {
            return GetAssembly("AssemblyName1");
        }),
        ref1: (function( )
        {
            return GetAssembly ("AssemblyName2");
        }),
        ref2: (function( )
        {
            return GetAssembly ("AssemblyName3");
        }),
    }
};
AddAssembly(Assembly);
```

The description of the assembly in the example above provides an identifier of the assembly, which in the above example is the identifier string following "Name:". In the example, several empty data structures are provided for storing information associated with types: TypeDefs, TypeRefs, Instances. TypeDefs contain definitions of types, TypeRefs contain unique identifiers (also referred to as "Type References") of types, and Instances contain instances of types loaded in the client computer.

In addition, the above example description of the assembly provides references (e.g., ref0, ref1, ref2) to other assemblies that are referenced by this assembly.

Note that in the description of the example assembly above, two API routines are invoked: GetAssembly( ) and AddAssembly( ). These API routines can be provided as part of the API(s) 120 (see FIG. 4) provided by the client-side code loading system 101. The AddAssembly( ) routine causes the identified assembly to be added to the local cache 116 in the client computer 100.

The GetAssembly( ) routine is invoked to load an assembly. The GetAssembly( ) routine when invoked can look in the local cache 116 to determine if the assembly has already been loaded in the client computer 100, and if so, the GetAssembly( ) returns the instance in the cache 116. However, if the assembly has not been loaded, the GetAssembly( ) routine will ask a LoadCode API routine (which can also be part of the API(s) 120 of the client-side code loading system 101) to download the assembly using the plugged transport mechanism 112 (FIG. 1). Note that assembly loading can also allow for additional assemblies (in addition to the requested assembly) to be loaded.

Examples of the AddAssembly( ) and GetAssembly( ) API routines are provided below:

```
/* void */ AddAssembly(/* assembly */ assembly)
/* assembly */ GetAssembly(/* string */ strongName)
```

The AddAssembly and GetAssembly routines are invoked by the procedure of FIG. 3 during execution of the program 108 to perform on-demand loading of assemblies.

As noted above, the transport mechanism 112 (FIG. 1) that can be used by the client-side code loading system 101 is pluggable so that the appropriate transport mechanism can be used for transporting code from the server computer 102 to the client computer 100. When the loader 110 is executed in the client computer 100, the loader 110 calls out a routine to detect the loading mechanism used at the client computer 100. In one example, this detection routine can be referred to as DetectLoadingMechanism. The programmer for a proprietary platform at the client computer 100 can overwrite the DetectLoadingMechanism routine to add the desired transport mechanism 112. To do so, a LoadCode( ) API routine can be defined that can be assigned a function corresponding to the transport mechanism. Note that the DetectLoadMechanism and LoadCode routine can be part of the API(s) 120 depicted in FIG. 4. In one example, the DetectLoadMechanism( ) routine can be defined as follows:

```
var xmlhttp;
function DetectLoadMechanism( )
{
    LoadCode = LoadCodeUsingXmlHttp;
    .
    .
    .
}
```

In one example, the LoadCode( )method is assigned a function LoadCodeUsingXmlHttp, which is a function for loading code from the server computer 102 to the client computer 100 using XMLHTTPREQUEST.

In other example implementations, other transport mechanisms besides XMLHTTPREQUEST can be used.

Type Loading

Type loading occurs in a similar fashion as assembly loading. Type loading allows for additional types (in addition to the requested type) to be loaded together with the requested type.

In one example, to load a type into the local cache 116 of the client computer 100, the following API routine (which can be part of the API(s) 120 of FIG. 4) can be used: AddType (Assembly, TypeObject, Function), where "Assembly" refers to the assembly containing the type, "TypeObject" refers to the type that is to be loaded, and "Function" is the code for retrieving metadata associated with TypeObject. The metadata associated with TypeObject includes the methods associated with TypeObject, parent(s) of TypeObject, and other information. An example of loading a type, named "System.Object," which is contained in an assembly identified by CurrentAssembly is provided below:

```
var CurrentAssembly = GetAssembly ("AssemblyName1");
AddType (CurrentAssembly, "System.Object", function( )
{
    var Ret = { };
    var Assembly = CurrentAssembly;
    var Methods = { };
    var Parents = { }
    Parents[GetTypeRef (Assembly, "System.Object").Id]=true;
    Ret ["Parents"] = Parents;
    Ret ["Name"] = "System.Object";
    Ret ["Assembly"] = CurrentAssembly;
    Methods ["m0"/*System.Object ( ) * /] = (function(instance)
    {
        ...
    });
```

```
    Methods ["m1"/*System.Object.ToString*/]=(function(instance)
    {
        ...
    });
    Ret["Methods"] = Methods;
    Ret["Fields"]={f1 : null, f2 : null, f3 : 0};
    Ret["Initializer"]=(function(instance)
    {
        instance.f1=0;
        return instance;
    });
    return Ret;
}
)( );
```

In the example above, the data structure Ret is returned by the AddType( ) routine, where the Ret data structure contains the methods associated with the type (which are assigned unique names such as m0, m1, in the example above), the containing assembly (which is set equal to CurrentAssembly in the example above), the parent(s) of the type, as returned by Parents[ ], the static field stored on the type object (which are assigned unique names, f1, f2, etc.), and initialized instances of the methods with corresponding instance fields, such as instance.f1.

The methods and fields on the type are each assigned a unique name that is used to make calls to such methods and fields from within the assembly boundary.

Note that the example above refers to a "basic" type, which is contrasted with modified types discussed further below.

The following are example API routines that can be provided in the API(s) 120 of the client-side code loading system 101:

```
/* typeDef */ GetTypeDef(/* assembly */ assembly, /* string */ type);
/* typeRef */ GetTypeRef(/* assembly */ assembly, /* string */ name);
```

The GetTypeDef API routine retrieves a type, based on the identified assembly and a string that identifies the type. Since methods and static fields are part of the type object, the methods and static fields can be accessed with the Members and Fields properties of the type, such as in the following example:

```
var type = GetTypeDef(assembly, "System.Object");
type.Members["m1"] ( );
type.Fields["f1"] = 5;
```

In the above example, type.Members is used to retrieve method m1, and type.Fields is used to retrieve static field f1.

The GetTypeRef API routine obtains a unique type reference (to uniquely identify the type) in the form of a unique identifier, and a reference to the containing assembly. The GetTypeRef API routine allows the unique identifier of the type to be obtained without first having to load the type.

As depicted in FIG. 1, all instances 115 of a type are cached in the cache 116 of the client computer 100 so that the type instances will yield the same unique identifier each time the instances are called.

To support modified types (different from the basic type discussed above) such as generic instances, arrays, reference parameters, and so forth, a set of helper API routines can be provided that create a type reference representing the modifier. For example, the following helper API routines (which can be part of the API(s) 120 of FIG. 4) can be provided:

```
/* typeRef */ GetInstance(/* typeRef */ template, /* [typeRef] */
typeParameters);
/* typeRef */ GetArray(/* typeRef */ typeRef, /* int */ rank);
/* typeRef */ GetReference (/* typeRef */ template);
```

A generic instance contains or wraps another type. An array is a container of multiple instances (objects) of a specific type. A reference parameter is a pointer (container) to a type.

Access Across Assembly Boundaries

In some example implementations, assemblies can be rebuilt or patched separately without having to do a full build of the program to avoid long compilation times in general. In accordance with some embodiments, the assemblies 136 (FIG. 1) are separately compiled to assembly placeholders 137 as discussed above. To allow cross-assembly calls while still allowing for separate compilation, a unique way of identifying a method field is provided.

The field data can be stored according to a public field, such as the following (which is defined in the type object):

Ret["PublicFields"]={"FieldName": "f1"};

To allow for retrieval of a field across an assembly boundary, an API routine, GetFieldDef( ) can be defined as follows (GetFieldDef can be provided as part of the API(s) 120 of FIG. 4):

/*string*/GetFieldDef(/*typeDef*/type,/*string*/name);

In the above, "typeDef" refers to the type on which the field is defined, and "name" refers to the name of the field.

In one example, to retrieve a field of an assembly named "AssemblyName1," and from a type having name "System.Object," the following code can be provided:

```
var assembly = GetAssembly ("AssemblyName1");
var type = GetTypeDef (assembly, "System.Object");
var fd = GetFieldDef (type, "FieldName");
type.Field[fd] = 5; //for static fields
    //or
instance.Fields[fd] = 5; //for instance fields
```

In the above, the invocation of fd=GetFieldDef (type, "FieldName") allows for either the static field type.Fields[fd] or instance field instance.Fields[fd] to be accessed across assembly boundaries.

To uniquely identify a method such that cross-boundary access can be provided, a unique identifier for each type is provided in the method signature (all parameters and the return type of the method). A mechanism is used to create a unique type identifier at runtime, where the unique type identifier is referred to as Type References. This allows types to be identified in a unique, short form way without having to build cross-assembly knowledge into the identifier.

To obtain a unique Type Reference, the GetTypeRef API routine can be used, as provided above. The GetTypeRef( ) routine returns a unique ID, along with a reference to the containing assembly.

Since a mechanism is provided in which a type can be uniquely identified without loading the type, a unique reference to a method can be defined as a method name and a list of the reference types of all corresponding parameters (arguments) of the method. One example of this is provided below:

```
"ToString", [GetTypeRef(Assembly ,"System.String"),
GetTypeRef(Assembly, "System.String")]
```

In the above example, "ToString" is the method name, and the list of the types of arguments (parameters) of the method (two arguments or parameters in the example above) is given by [GetTypeRef(Assembly, "System. String"), GetTypeRef (Assembly, "System. String")].

In this manner, overloading of methods is supported, in which multiple methods with the same name can be provided, but these multiple methods with the same name (e.g., "ToString" above) have different signatures in the form of a list of reference types of the arguments (parameters) of the corresponding methods.

Method overloading is further supported by providing a dictionary from a method name to dictionaries of reference type lists to method identifiers. In one embodiment, the dictionary is provided as an entry in the type object, referred in one example as a "PublicMethods" entry:

```
Ret["PublicMethods"]=
    {
        ".ctor":[[[Assembly.GetTypeRef("System.Void")],
    "m0"/*System.Object( )*/]],
        "ToString":[[[Assembly.GetTypeRef("System.String")],
    "m1"/*System.Object.ToString*/]]
    };
```

Public methods can be accessed (across assembly boundaries) using the following API routine (which can be part of the API(s) 120 depicted in FIG. 4):

```
/* function */ GetMethodDef(/* string */ name, /* [typeRef] */
types);
e.g.
    var assembly = GetAssembly("Assembly Name 1");
    var objType = GetTypeDef(assembly, "System.Object");
    var toStringRef = GetTypeRef (assembly, "System.String");
    var methodDef( ) = GetMethodDef(objType, "ToString",
    ",[toStringRef]);
    var result = methodDef( )
```

Virtual Calls/Virtual Table

In accordance with some embodiments, support for making virtual calls to methods that are described on a type defined in another assembly is provided. For example, a call can be made to a parent type (referred to as a supertype), which can be located in a different assembly. As a result of the virtual call to a method described on a type defined in another assembly, some form of translation has to be provided, such as in the form of a dictionary (e.g., virtual table or vtable). In another scenario, a method may be defined in a base type, but a derived type (derived from the base type) may have overridden the base type method. At run-time, a mechanism should be provided to determine which version of the method (defined by the base type or derived type) should be called. This is accomplished using the vtable.

The vtable (or virtual table) acts as a dictionary from a method reference to a method definition. In other words, given a call to a particular method, the definition of the method has to be retrieved for execution.

Method references are referred to as MethodRefs, which are similar to Type References discussed above. MethodRefs represent a method with a unique identifier that is generated at runtime. A MethodRef can be retrieved using the following API routine (part of the API(s) 120 of FIG. 4):

```
/* methodRef */ GetMethodRef(/* TypeRef */ definingType, /* string */
name, /* [typeRef] */ types);
```

The MethodRefs are relatively small identifiers, which allow lookups in a vtable to be relatively fast. An example of obtaining a MethodRef is provided below:

```
var tr = GetTypeRef(Assembly, "System.Object");
var mr = GetMethodRef(tr, "ToString",
    [Assembly.GetTypeRef("System.String")]);
``` where the example MethodRef is stored in a variable mr.

The following is an example of a vtable that can be built according to some embodiments to act as a dictionary from MethodRef to MethodDef:

```
var VTable = { };
VTable[GetMethodRef(GetTypeRef(Assembly, "System.Object"),
"ToString",
    [Assembly.GetTypeRef("System.String")])]=Methods.m1;
VTable[GetMethodRef(GetTypeRef(Assembly, "System.Object"),
    "GetHashCode", [GetTypeRef(Assembly, "System.Int32")])])
    =
    GetMethodDef(GetTypeDef(Assembly.Refs.ref0( ),
    "System.Object"),
        "GetHashCode", [Assembly.GetTypeRef("System.Int32")]);
Ret["Vtable"]=Vtable;
```

In the example above, the type is derived from base type System.Object, and the vtable indicates that the ToString method in method m1 is overridden. However, vtable does not override the GetHashCode method, so the entry for that method is pointing to the method definition that was given in the base type System.Object.

Note also that methods can be added to the vtable without loading a base type. In other words, mapping from a method reference (MethodRef) to a method definition (MethodDef) without loading the base type.

The following illustrates an example of accessing a vtable:

```
var tr = GetTypeRef(Assembly, "System.Object");
var mr = GetMethodRef(tr, "ToString",
    [Assembly.GetTypeRef("System.String")]);
var methodDef = instance.Type.VTable[mr];
methodDef(instance);
```

Thus, according to some embodiments, a mechanism is provided to allow for type-by-type loading of software code according to an on-demand basis during execution of a program on a first computing device. The type-of-type loading of software code is transparent to the program, and types can be performed in a manner where a superset of types can be returned in response to a request for one particular type. Also, the transport mechanism to perform the type-by-type loading of software code is performed is pluggable so that an optimal (or better) transport mechanism can be used to perform the loading. Moreover, unique identifiers can be obtained for types without having to load the types. In addition, methods and fields associated with types can be assigned unique identifiers such that they can be accessed across assembly boundaries.

Instructions of software described above are loaded for execution on a processor (such as one or more CPUs 124, 132 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computer-implemented method comprising:
   receiving, by a first computing device over a network from a second computing device, a first request for a container that includes information relating to types of software code that are potentially invoked by a program executing on the second computing device;
   generating the container;
   sending the container to the second computing device in response to the first request;
   receiving, from the second computing device, a second request identifying a particular type of software code, the second request indicating that a determination was made, according to an on-demand basis and during execution of the program on the second computing device, that the particular type of software code is to be loaded from the first computing device to the second computing device, the determination indicating that the particular type of software code was invoked by the program and that the particular type of software code is not loaded in the second computing device; and
   transmitting, from the first computing device to the second computing device in response to receiving the second request, information relating to the particular type of software code, the information at least partly enabling the second computing device to at least partly fill the container with information relating to the particular type of software code in response to the particular type of software code being loaded into the second computing device.

2. The method of claim 1, further comprising:
   transmitting at least another container from the first computing device over the network, the at least another container including information relating to further types of software code that are potentially invoked by the program, the information relating to further types of software code enabling the second computing device to determine additional types of software code that are to be loaded for the at least another container.

3. The method of claim 2, wherein transmitting the at least another container includes transmitting placeholders of assemblies compiled from corresponding assemblies by the first computing device.

4. The method of claim 1, wherein the particular type is a set of software methods.

5. The method of claim 1, wherein the contain is configured to enable adding further content to the container as other types of software code are loaded in the second computing device.

6. The method of claim 1, further comprising transmitting, by the first computing device to the second computing device, at least one additional type of software code in addition to the particular type, the at least one additional type of software code being transmitted in response to the second request for the particular type of software code.

7. The method of claim 1, further comprising transmitting, by the first computing device, unique identifiers of types of software code eligible for loading into the second computing device.

8. The method of claim 7, further comprising creating the unique identifiers for the types.

9. The method of claim 1, wherein the types of software code are part of plural assemblies, the method further comprising:
uniquely identifying fields and methods in each assembly to enable cross-assembly access of the fields and methods.

10. The method of claim 1, further comprising:
providing plural methods of a same name but having different signatures.

11. The method of claim 1, further comprising:
determining a transport mechanism in the second computing device to plug in the second computing device for loading types of software code from the first computing device.

12. The method of claim 1, wherein the container refers to another container.

13. The method of claim 1, further comprising transmitting, from the first computing device to the second computing device in response to receiving the second request, unrequested information relating to an unrequested type of software code, the unrequested information at least partly enabling the second computing device to at least partly fill another container with information relating to the unrequested type of software code in response to the unrequested type of software code being loaded into the second computing device.

14. The method of claim 1, further comprising generating an assembly placeholders by compiling an assembly.

15. A hardware computer-readable storage medium storing instructions that when executed cause a first computing device perform a method, the method comprising:
receiving, by the first computing device over a network from a second computing device, a first request for a container that includes information relating to types of software code that are potentially invoked by a program executing on the second computing device;
generating the container;
sending the container to the second computing device in response to the first request;
receiving, from the second computing device, a second request identifying a particular type of software code, the second request indicating that a determination was made, according to an on-demand basis and during execution of the program on the second computing device, that the particular type of software code is to be loaded from the first computing device to the second computing device, the determination indicating that the particular type of software code was invoked by the program and that the particular type of software code is not loaded in the second computing device; and
transmitting, from the first computing device to the second computing device in response to receiving the second request, information relating to the particular type of software code, the information at least partly enabling the second computing device to at least partly fill the container with information relating to the particular type of software code in response to the particular type of software code being loaded into the second computing device.

16. The hardware computer-readable storage medium of claim 15, wherein the method further comprises transmitting at least another container from the first computing device over the network, the at least another container including information relating to further types of software code that are potentially invoked by the program, the information relating to further types of software code enabling the second computing device to determine additional types of software code that are to be loaded for the at least another container.

17. The article of claim 15, wherein the container refers to another container.

18. A first computer comprising:
a network interface for communication over a network with at least a second computer; and
a processor operable with the network interface to:
receive from a second computer a first request for a container that includes information relating to types of software code that are potentially invoked by a program executing on the second computer;
generate the container;
send the container to the second computer in response to the first request;
receive, from the second computer, a second request identifying a particular type of software code, the second request indicating that a determination was made, according to an on-demand basis and during execution of the program on the second computer, that the particular type of software code is to be loaded from the first computer to the second computer, the determination indicating that the particular type of software code was invoked by the program and that the particular type of software code is not loaded in the second computer; and
transmit, to the second computer in response to receiving the second request, information relating to the particular type of software code, the information at least partly enabling the second computer to at least partly fill the container with information relating to the particular type of software code in response to the particular type of software code being loaded into the second computer.

19. The first computer of claim 18, wherein the container comprises a placeholder of an assembly compiled by the first computer from the assembly.

20. The first computer of claim 18, wherein the container refers to another container.

* * * * *